Dec. 10, 1957    M. W. BLOOM ET AL    2,815,704
ELEVATING AND DEPTH GAUGING MEANS FOR TRACTOR IMPLEMENTS
Filed Aug. 31, 1954    6 Sheets-Sheet 1
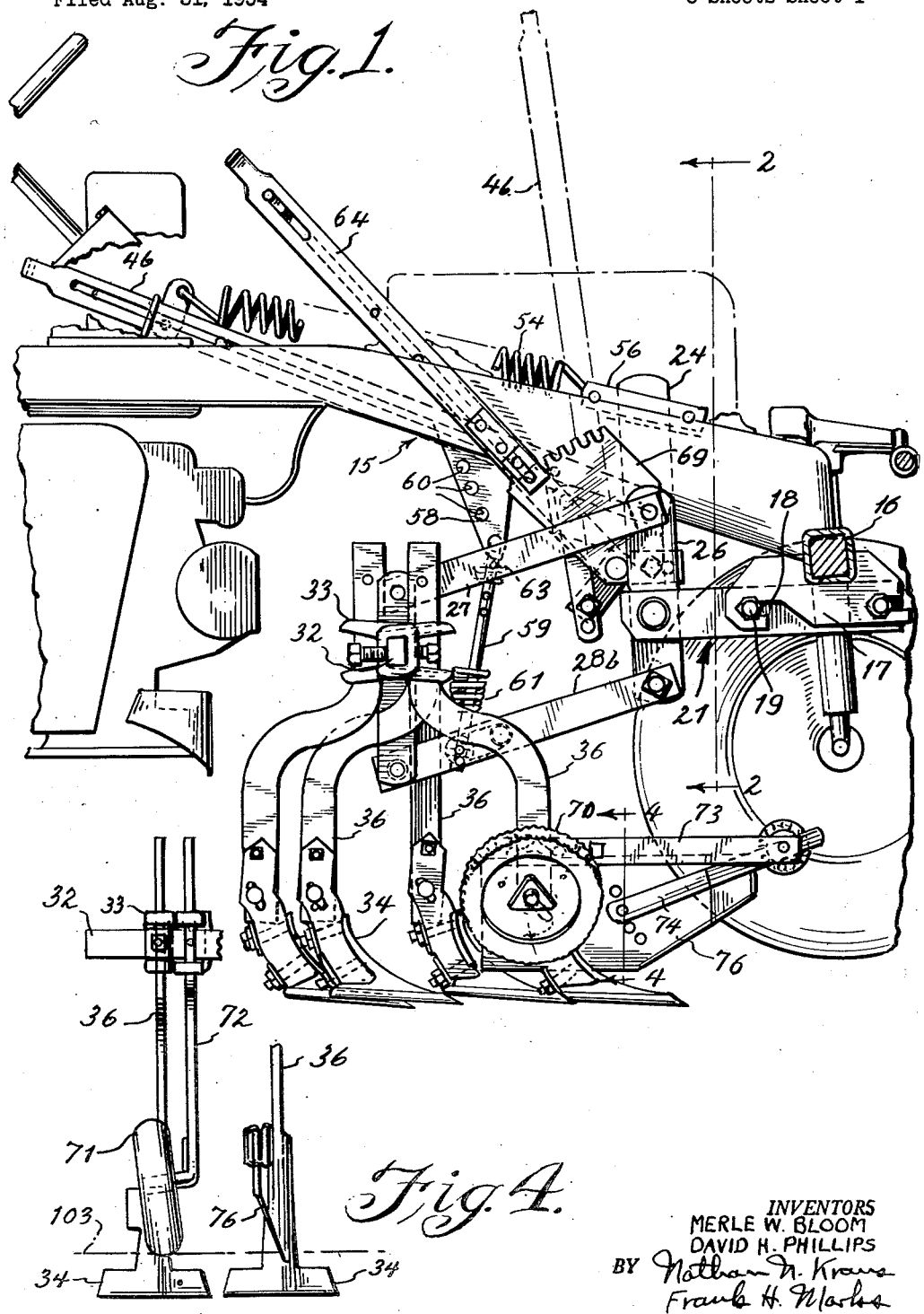
INVENTORS
MERLE W. BLOOM
DAVID H. PHILLIPS
BY
ATTORNEYS

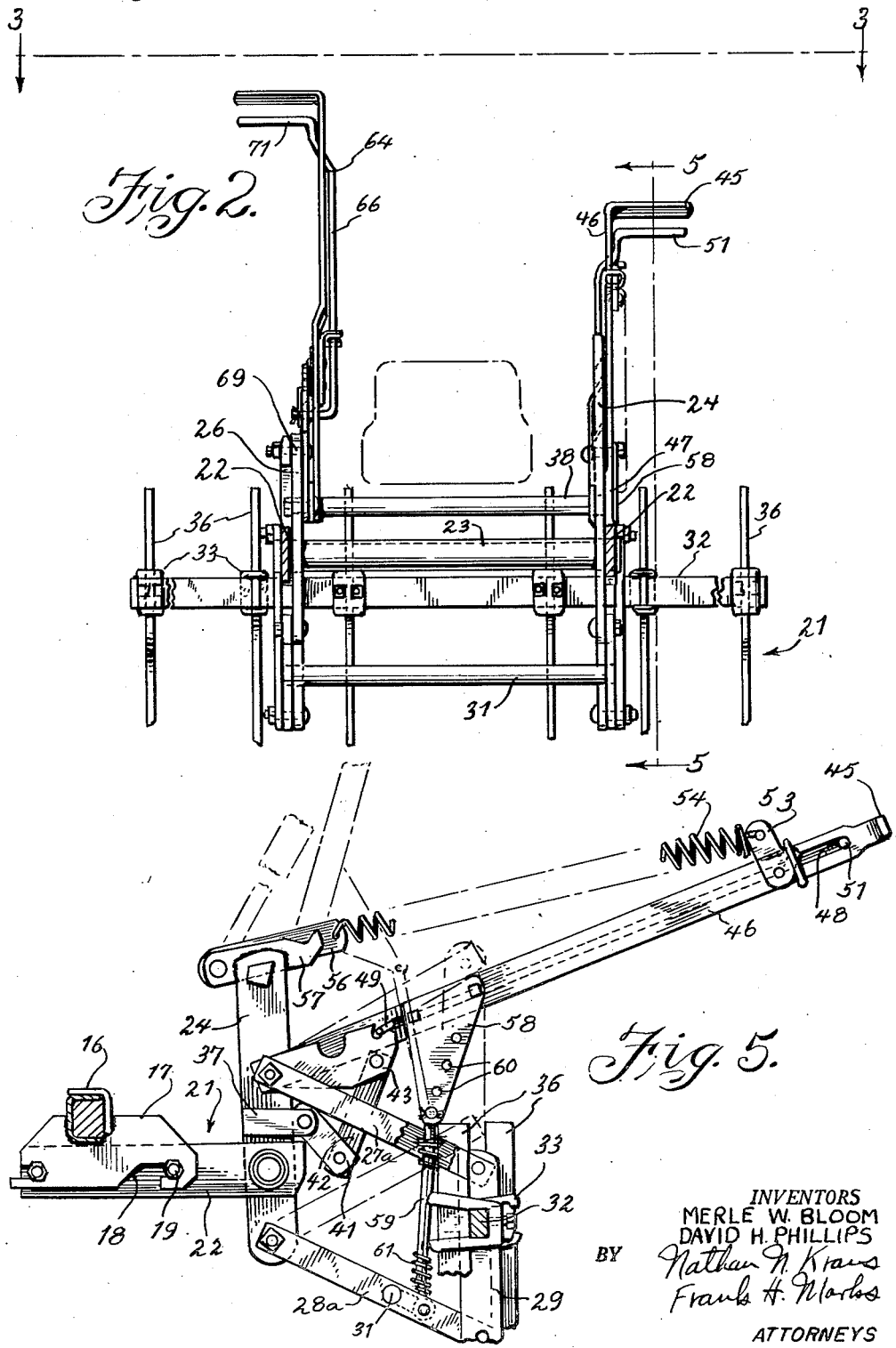

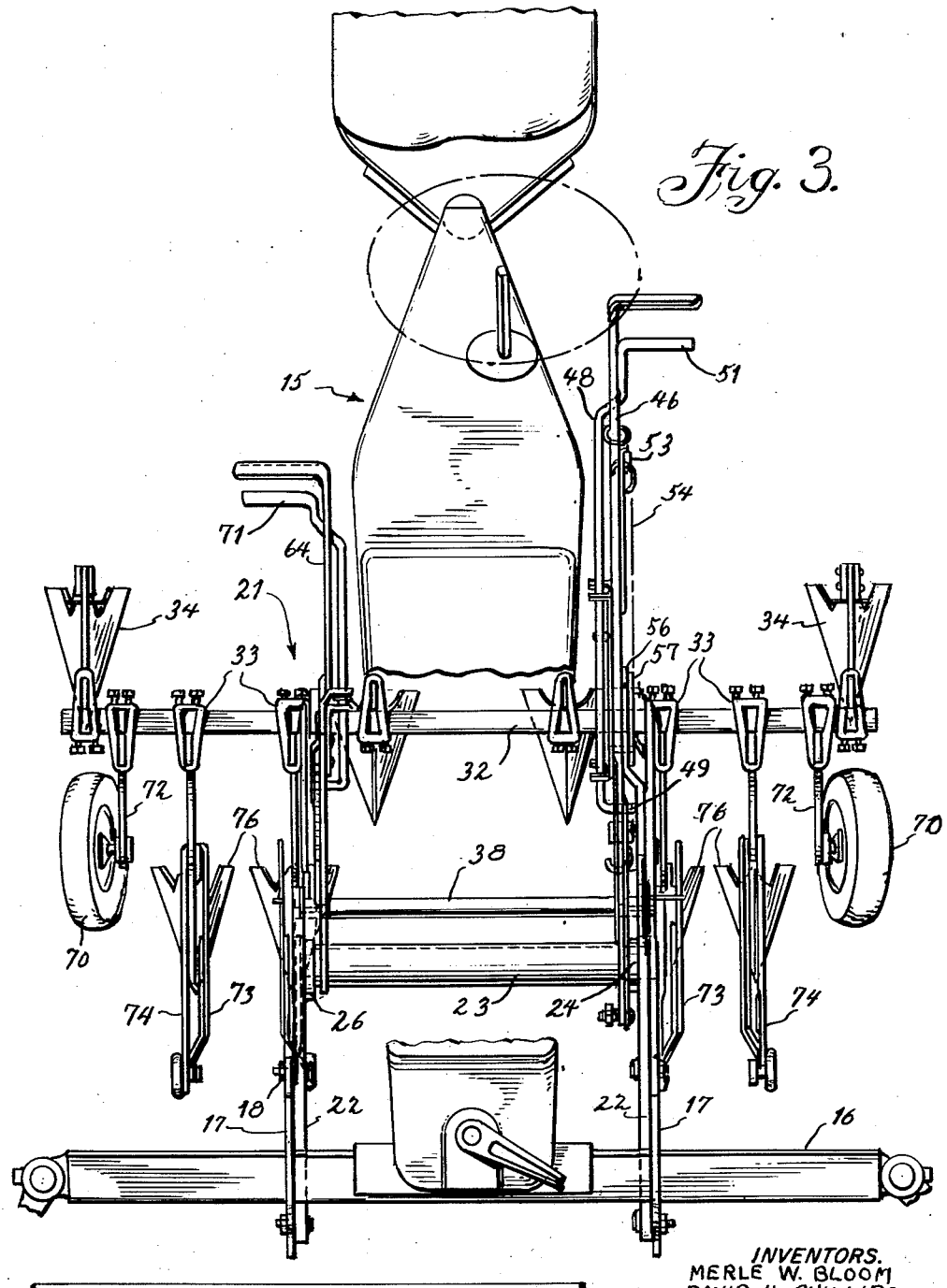

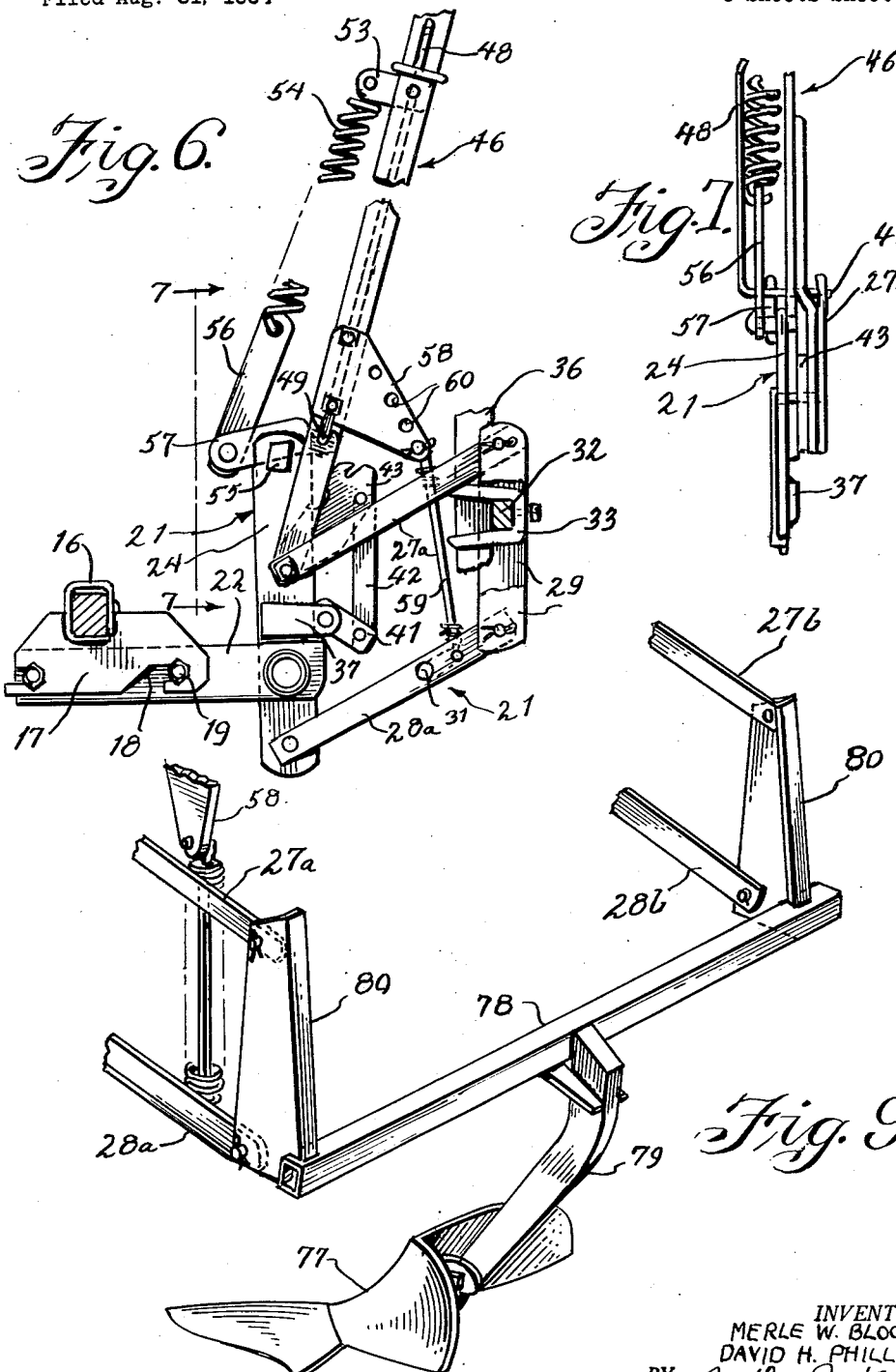

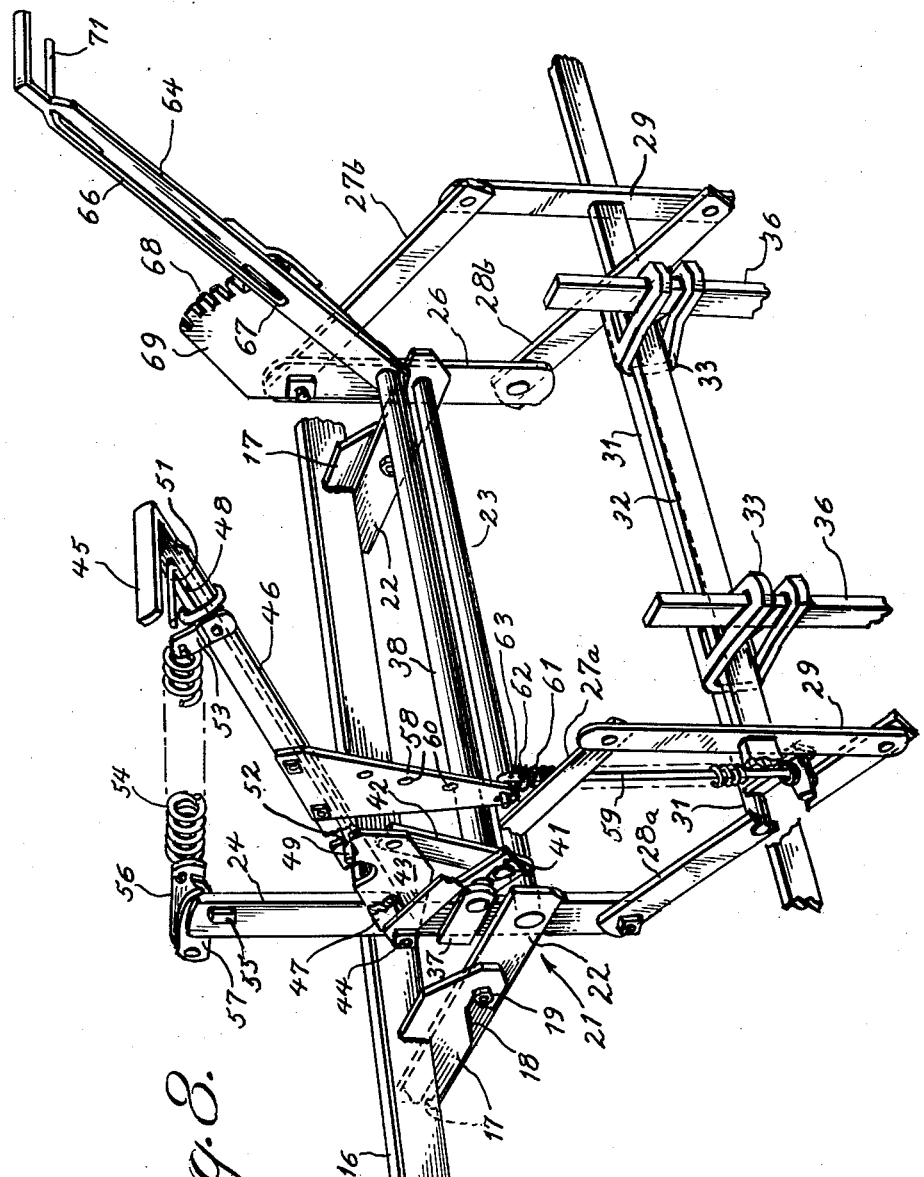

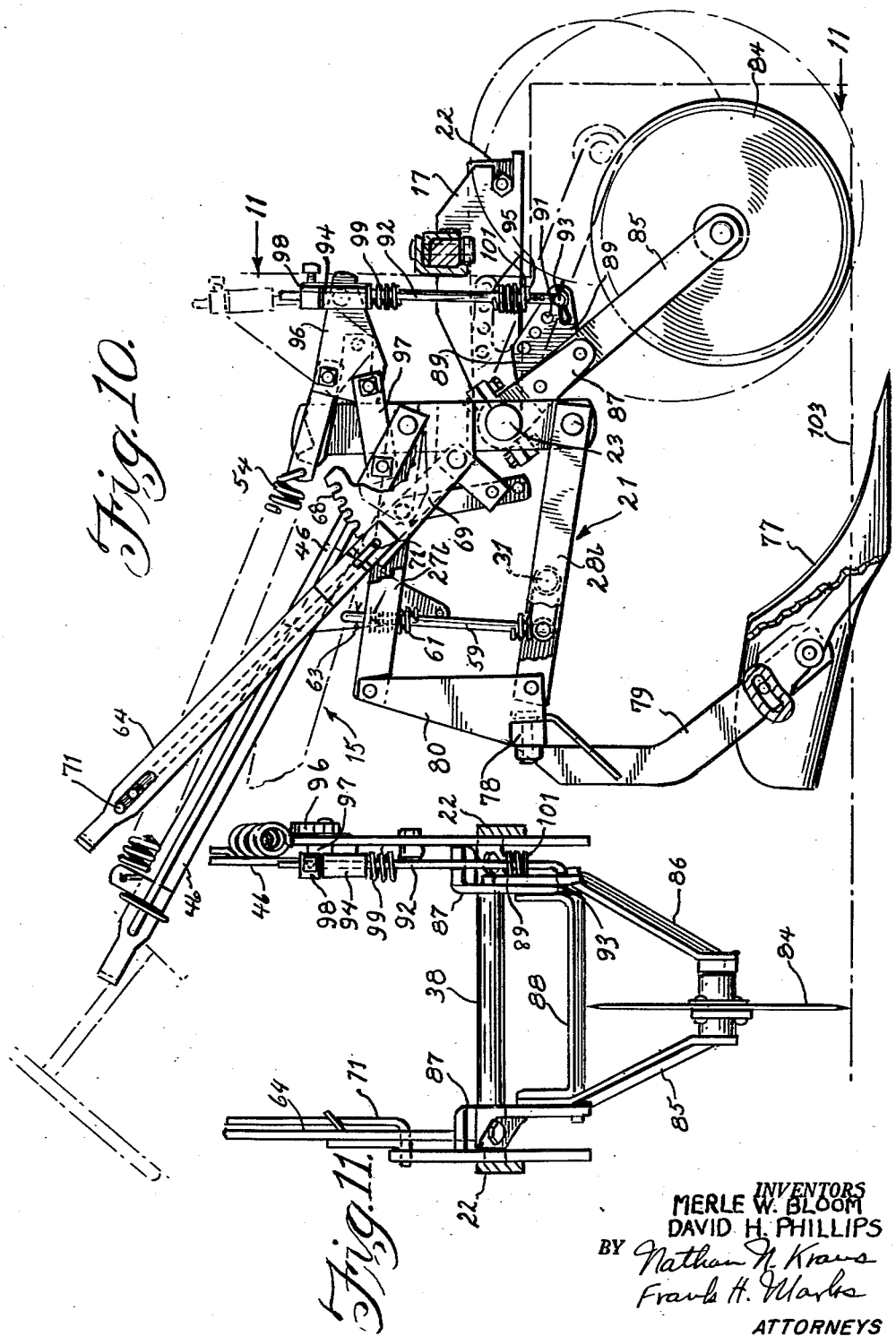

United States Patent Office 2,815,704
Patented Dec. 10, 1957

2,815,704

ELEVATING AND DEPTH GAUGING MEANS FOR TRACTOR IMPLEMENTS

Merle W. Bloom, Kankakee, and David H. Phillips, Bradley, Ill., assignors to Sears, Roebuck and Co., Chicago, Ill., a corporation of New York Application August 31, 1954, Serial No. 453,282

8 Claims. (Cl. 97—47.43)

This invention relates to agricultural implements generally and more particularly to tractor mounted implements embodying means for moving the ground working tools of such implements to and from ground working position and for closely adjusting the depth of penetration of the same.

The object and general nature of the present invention is the provision of a novel implement mounting construction adapted for ready attachment to a tractor structure and embodying a simplified mechanism which makes possible the adjustment of penetration of the ground working tools to a desired depth and also the movement of said tools into or out of engagement with the ground without disturbing the adjustment of said tools.

Another object of this invention is the provision of an arrangement in which the implement may be mounted on a tractor merely by connecting only a very small number of parts, yet when attached, the implement is securely and rigidly mounted on and connected with the tractor the same as if it were an integral part thereof.

Another object of this invention is the provision of an implement attachment which is simple and compact in construction and efficient in operation.

Other and further objects and advantages of this invention will become apparent from the following description when considered in connection with the accompanying drawings in which:

Fig. 1 is a side elevational view of a cultivator implement attached to a tractor, only certain parts of the latter being illustrated.

Fig. 2 is a cross sectional view taken substantially on line 2—2 of Fig. 1.

Fig. 3 is a top plan view looking in the direction of the arrows 3—3 of Fig. 2.

Fig. 4 is a front elevational view of structural details looking in the direction of the arrows 4—4 of Fig. 1.

Fig. 5 is a cross sectional view taken substantially on line 5—5 of Fig. 2 and showing the parts in ground operating position.

Fig. 6 is a view similar to Fig. 5 showing the parts in elevated position.

Fig. 7 is a cross sectional view taken substantially on line 7—7 of Fig. 6.

Fig. 8 is a perspective view of the mechanism for raising and lowering the ground working tools.

Fig. 9 is a perspective view of a somewhat modified construction for attaching a middle buster to the operating mechanism.

Fig. 10 is a side elevational view of a modified construction for attaching a middle buster and coulter to the operating mechanism.

Fig. 11 is a front elevational view taken substantially on line 11—11 of Fig. 10.

Referring to the drawings, the numeral 15 indicates generally a tractor which may be of any suitable construction and adapted for having attached thereto a ground working implement. In the present instance a tractor is illustrated embodying certain novel features which are not directly related to the present invention, but are more fully disclosed in another copending application Ser. No. 412,168, now Patent No. 2,788,858. The tractor 15 is equipped at its forward end, in the present instance, the forward axle 16, with a pair of depending brackets 17 which are welded to the axle. The brackets are provided with slots 18 as illustrated clearly in Fig. 1, to receive bolts 19 which serve as the means by which an implement may be readily attached to and detached from the tractor.

The implement to which this invention is related may be a cultivator or middle buster which is carried on a frame indicated generally by the numeral 21. The said frame comprises a pair of spaced support arms 22 bolted to the brackets 17 and welded to a transverse support member 23 which may be in the form of a tube. The said member has welded thereto a pair of spaced upright members 24 and 26, the left hand upright member 24 being of greater length and extending above the corresponding right hand member 26. Pivotally connected to said upright members are pairs of upper and lower parallel links 27a, 27b and 28a, 28b, respectively, to the ends of which are pivotally connected vertical link members 29 thus forming a parallelogram lift frame. To the lower parallel links 28 is welded a transverse bracing member 31 for the purpose of affording rigidity to the structure. A transversely extending tool bar 32 is passed through openings in the vertical link members 29 and preferably welded thereto. Clamped to the tool bar 32 as by clamps 33 are a plurality of ground working sweeps 34, the shanks 36 of which may be straight or forwardly or rearwardly offset to dispose the shovels 34 attached thereto in different planes. It will be seen that the construction of the clamps is such that the shanks 36 may be adjusted longitudinally of the tool bar 32 as well as vertically for positioning the cultivator sweeps in desired relationship to each other and to the ground.

Welded to the member 24 is a rearwardly extending arm 37 which serves as a journal for one end of a rock shaft 38 the other end of which is journaled in a quadrant plate 69 suitably attached to the upright member 26. A crank arm 41 is welded to the shaft 38 and has its free end pivotally connected to a link 42 which is pivotally connected to a notched latch plate 43 pivotally supported on a bolt 44 passing through the upright member 24 and also pivotally connecting the upper parallel link 27a thereto. A master lift lever 46 having a forked end 47 is pivotally supported on the bolt 44 with the forked end embracing the latch plate 43 and upright member 24. A spring biased plunger rod 48 is supported on the lift lever 46 for relative longitudinal movement, the said plunger rod having its lower end bent substantially at a 90 degree angle to provide a latching element 49 while its upper end is similarly bent to provide a hand engaging portion 51 whereby the plunger rod 48 may be moved longitudinally. In operating position the latching element 49 is engaged in the notch 52 of the latch plate 43. Disengagement of said locking element from the latch plate may readily be effected by the operator by drawing the hand engaging portion 51 of the plunger rod towards the handle portion 45 to move the element 49 out of engagement with the notch 52 in the latch plate 43. The lift lever 46 is provided with a lateral extension 53 to one end of which is connected a relatively strong coiled tension lift spring 54, the other end of said spring being connected to a link 56 which is pivotally mounted on one end of a latching member 57 welded to the upright member 24. The latch member 57 when engaged by the latching element 49 serves to retain the lift frame and tools in non-operative position. The lift spring 54 exerts sufficient tension substantially to counterbalance the weight of the lift frame and tools attached thereto so as to assist the operator in raising the same to non-operative position. A lateral abutment 55 is welded to the member 24 to serve as a stop for the lever 46.

Rigidly secured to the lift lever 46 is a substantially triangular lift plate 58 having pivotally connected thereto a lift rod 59 the lower end of which is swivelly connected to the lower parallel link 28a. The lift plate is provided with a series of apertures 60 to receive the upper end of the lift rod for the purpose of effecting a desired adjustment. A coiled spring 61 carried on the lift rod 59 serves to apply downward pressure on the link 28a through the swivel joint, this pressure being adjustable by means of a washer 62 carried on the lift rod, the said washer being retained in a position of adjustment by a cotter pin 62 inserted through one of the series of holes 63 in the lift rod. The pressure of the spring 61 serves to prevent the lift frame and tool bar from raising when a ground working tool such as a sweep strikes a hard object but permits sufficient vertical movement of the lift frame to prevent breakage or bending of the parts in the event of such an occurrence. The structure just described provides means for moving the ground working tools into operative or non-operative engagement with the ground.

The means for effecting a ground penetration adjustment in the working position of the ground working tools is accomplished through an auxiliary lever 64 fixed to the rock shaft 38, the said lever similarly being provided with a spring biased plunger rod 66 having a latching element 67 at its lower end adapted to engage in one of the notches 68 in a quadrant plate 69, fixed to the upright member 26. The said plunger rod is provided with hand engaging portion 71 which when drawn in the direction of the handle portion of the lever 64 effects disengagement of the latching element 67 from one of the notches 68. As will be apparent, the auxiliary lever 64 is rockable within the limits defined by the end notches 68 in the quadrant plate 69, and correspondingly when the said lever is rocked the cross shaft 38 is correspondingly rotated.

A pair of depth gauging wheels 70 preferably one at each end of the tool bar 32 are each supported on a shank 72 which is clamped to the tool bar. The said wheels may be adjusted vertically to any desired height. Certain of the shanks 36 carrying the sweeps 34 have rigidly mounted thereon forwardly directed arms 73 carrying arms 74 to which are attached a plant shield 76 in the form of sheet metal plates, the said shields each having a series of apertures for effecting adjustment of the shields.

In the modified embodiment illustrated in Fig. 9 a middle buster 77 is illustrated as being attached to the lift frame. To this end the rearward link members 29 and tool bar 32 are removed and replaced by the structure illustrated which includes two substantially triangular end members 80 which are pivotally connected to the parallel arms 27a, 27b and 28a, 28b as with pins the said end members being welded to a cross bar 78 to which is suitably secured substantially medially thereof a shank 79 carrying a middle buster 77. It will be apparent that the foregoing tool is readily interchangeable with the cultivator tools hereinbefore described.

Referring to Fig. 6 the parts are shown in non-operative position with the latching element 49 of the plunger rod 48 engaged with the latching member 57. In this position the ground working tools are elevated above the ground surface and are secured against dislodgement. In order to move the ground working tools to working position the hand engaging portion 51 of the plunger rod 48 is moved towards the handle portion 45 of the lift lever so as to effect disengagement of the latching element 49 from the latching member 57. The parallelogram lift frame and associated structure may then be moved to the ground working position illustrated in Fig. 5. It will be noted that because the master lift lever 46 is connected to the lower parallel link 28a through the instrumentality of the plate 58 and lift rod 59, the parallelogram lift frame will move simultaneously with the lever 46 to operative or inoperative position. It will also be apparent that because of the parallelogram arrangement, the link members 29 of the triangular end members 80 will maintain a vertical relationship throughout their movement from one position to another and that accordingly the ground working tools will always be maintained in the same vertical relationship regardless of the position of the lift frame.

The depth of penetration of the ground working tool in working position is accomplished by adjustment of the angle assumed by the notch in the latch plate 43. It will be seen that the auxiliary lever 64 is capable of a limited rocking movement between the end notches of the quadrant plate 69. These provide a definite working range for the tool bar and ground working tools. It will also be seen that as the auxiliary lever 64 is rocked about its pivotal axis in one direction or another, as the case may be, motion is transferred through the rock shaft 38, through the arm 41 and through connecting link 42 to the latch plate 43. Thus the position of the latch plate 43 is determined by the position of the auxiliary lever 64. When the lift frame and associated tool structure are moved from inoperative position to operative position, the latching element 49 is caused to engage in the notch of the latch plate 43 thereby locking the structure in operative position in a predetermined adjustment. It will be apparent that as the lift frame and associated structure are moved from operative to inoperative position or vice versa, the relationship of the auxiliary lever 64 to the notches 68 in the quadrant plate 69 is not disturbed. Hence the latch plate 43 maintains a position of adjustment and is not affected by any movement of the master lift lever 46 and lift frame and associated structure.

Referring to Figs. 10 and 11 there is illustrated a coulter attachment to be used in connection with the middle buster bottom attachment just described. A disc coulter 84 is rotatably supported between two yoke bars 85 and 86 which are bolted to spaced bearing brackets 87 pivotally mounted on the support tube. Thus, the coulter and supporting yoke bars may rotate about the axis of the said support member 23. A substantially U-shaped spreader member 88 is secured between the yoke bars 85 and serves to maintain the bearing brackets 87 in spaced relation. A lift plate 89 is secured to the yoke bar 86, the said plate being provided with a plurality of apertures 91 for connection with the lift rod 92. The lower end 93 of the lift rod is L-shaped and adapted to be received in one of the apertures to provide for adjustment. The upper end of the lift rod 92 passes through a knuckle 94 pivotally supported on a lift arm 96 which is in turn pivotally supported on the forward extension of the latch member 57. The lift arm 96 is substantially triangular in shape and is pivotally connected below its pivotal axis to a link 97 which is in turn pivotally connected to the master lift arm 46. It will be apparent that movement of the master lift arm 46 will effect a rocking of the lift arm 96 about its pivotal axis. A collar 98 provided with a set screw provides means for adjusting the effective length of the lift rod 92 which is maintained in adjusted position by the said collar and the extending force of a relief spring 99 embracing the rod 92 and acting between the lower side of the knuckle 94 and a washer 101 on the lift rod, the position of the washer being adjustable by means of a cotter pin 95 which is passed through one of a series of openings in the lower end of the lift rod 92.

In Fig. 10 the parts in solid lines are shown in operating or ground working position, the ground surface being indicated by the line 103. When the lift lever 46 is moved upwardly or clockwise as viewed in Fig. 10 motion is imparted to the lift arm 96 through the connecting link 97 to cause the lift arm 96 to rock counter-clockwise about its pivotal axis to assume the position shown by dotted lines in Fig. 10. The lift rod 92 is caused to move upwardly and carry with it the structure connected thereto which includes the lift plate 89, yoke bars 85 and 86 and rolling coulter 84 which are caused to assume the inoperative positions indicated by the dotted lines. The middle buster bottom 77 and lift frame structure correspondingly move upwardly in the manner hereinabove described.

In effecting movement of the parts from inoperative to operative position the master lift lever 46 is rocked counterclockwise, as viewed in Fig. 10, causing the lift arm 96 to rock from the dotted line to the full line position about its pivotal axis. The knuckle 94 in moving downwardly exerts pressure on the relief spring 99 which in turn applies pressure to the lift rod 92 through the washer 101 and cotter pin carried thereon. The lift rod 92 being connected to the lift plate 89 and associated structure effects a downward rotation of the yoke bars 85 and 86 and rolling coulter 84 to assume the full line position shown in Fig. 10. The effective length of the lift rod 92 and thus the range of movement of the rolling coulter 84 is determined by adjustment of the setting of the set screw collar 98 with respect to the lift rod. The relief afforded to the rolling coulter 84 allowing it to ride over rocks or other obstructions is determined essentially by the location of the position of the washer 101 and cotter pin beneath the spring 98, the higher the position of the washer the greater the compression of the spring and accordingly less relief to the rolling coulter. The apertures 91 in the lift plate 89 provide a series of adjustable positions for the rolling coulter, for example if the aperture in closest proximity to the pivotal axis of the yoke bars 85, 86 is employed the coulter 84 will move through its maximum arc, and accordingly the coulter may be positioned for a maximum penetration. It will be noted that when the lift plate 89 is moved to inoperative position as indicated by the dotted lines in Fig. 10, the apertures are disposed substantially in a horizontal plane and accordingly regardless of the position of depth adjustment of the coulter 84 it will be seen that the coulter assumes substantially the same inoperative position thus providing uniform raised clearance regardless of the depth adjustment of the rolling coulter.

It will be clear that rocking of the master lever in a clockwise or counter-clockwise direction will effect simultaneous movement of the ground working tool and the rolling counter. The distance required to be travelled by the tool is greater than that for the coulter because the tool must assume a ground penetrating position which is lower than that required to be assumed by the coulter. Accordingly for a particular movement of the lift lever the travel of the tool or middle buster bottom will be greater than the travel of the coulter.

Various changes coming within the spirit of our invention may suggest themselves to those skilled in the art. Hence we do not wish to be limited to the specific embodiments described or uses mentioned, but intend the same to be merely exemplary, the scope of our invention being limited only by the appended claims.

We claim:

1. In a tractor implement an upright member adapted for attachment to a tractor, upper and lower parallel links pivotally connected to said upright member, a vertical link pivotally connected to said upper and lower links, said upright member and said links constituting a parallelogram linkage arrangement, one of said links supporting a ground working tool, a master lift lever pivotally connected to said upright member, link means connecting said lever with one of said parallelogram links, an arm pivotally supported at one end on said upright member, a coulter supported for rotation on the other end of said arm, a lift arm pivotally connected to said upright member and operatively connected with said first mentioned lift lever, and a lift rod connecting said arm with said lift arm, the movement of said lift lever effecting simultaneous movement of said tool and said coulter into operative or inoperative position.

2. In a tractor implement an upright member adapted for attachment to a tractor, upper and lower parallel links pivotally connected to said upright member, a vertical link pivotally connected to said upper and lower links, said upright member and said links constituting a parallelogram linkage arrangement, one of said links supporting a ground working tool, a master lift lever pivotally connected to said upright member, link means connecting said lever with one of said parallelogram links, an arm pivotally supported at one end on said upright member, a coulter supported for rotation on the other end of said arm, a lift arm pivotally connected to said upright member and operatively connected with said lift lever, a lift rod connecting said first mentioned arm with said lift arm, the movement of said lift lever effecting simultaneous movement of said tool and said coulter into operative or inoperative position, latch means pivotally connected to said upright member, a latching element carried on said master lift lever and engageable with said latching means, and means for rocking said latch means to position the same in one of different positions of adjustment.

3. In a tractor implement a parallelogram linkage arrangement including a stationary member adapted for attachment to a tractor, a ground working tool supported by said linkage arrangement, means for moving said linkage arrangement to move said tool into operative or inoperative position, a latching element associated with said means, latch means pivotally connected to said stationary member and cooperating with said latching element to lock said linkage arrangement in a position of adjustment, means for rocking said latch means to position the same in one of different positions of adjustment, an arm pivotally supported at one end on said stationary member, a coulter supported for rotation on the other end of said arm, a lift arm pivotally connected to said first mentioned upright member and operatively connected with said lift lever, a lift rod connecting said arm with said lift arm, the movement of said master lift lever effecting simultaneous corresponding directional movement of said tool and said coulter into operative or inoperative position.

4. In a tractor implement, a frame assembly, means for connecting said frame assembly to a tractor, said frame assembly including a pair of spaced stationary upright members, an upper and a lower parallel link pivotally connected to each of said upright members, a vertical link pivotally connected to corresponding upper and lower parallel links, said upright members and said links constituting a parallelogram linkage arrangement, a transverse tool bar secured to said vertical links, a tool supported by said tool bar, a master lift lever pivotally connected to one of said upright members, a lift rod pivotally connected at one end of said lever, the other end of said rod being connected to one of said lower parallel links, a rock shaft journalled in said upright members, an auxiliary lever fixed on said shaft, an arm fixed on said shaft, a latch plate pivotally connected to one of said upright members, a link connecting said arm and said latch plate, a latching element carried on said master lift lever and engageable with said latch plate, a bar connecting said upright members, a forwardly extending pair of yoke arms pivoted at one end of said bar, a coulter supported for rotation at the other end of said yoke arms, a forwardly extending lift arm pivotally connected to one of said upright members, a link connecting said master lever and said lift arms, said link being connected to said lift arm at a point below the pivotal connection of said lift arm and said upright member, a lift rod connecting said lift arm at the forward end thereof with one of said yoke arms, the movement of said master lift lever effecting simultaneous corresponding directional movement of said tool and said coulter into operative or inoperative position.

5. In a tractor implement, a frame assembly, means for connecting said frame assembly to a tractor, said frame assembly including a pair of spaced stationary upright members, an upper and a lower parallel link pivotally connected to each of said upright members, a vertical link pivotally connected to corresponding upper and lower parallel links, said upright members and said links constituting a parallelogram linkage arrangement, a transverse tool bar adapted to be secured to said linkage arrangement, a tool adapted to be supported by said tool bar, a master lift lever pivotally connected to one of said upright members, a lift rod pivotally connected at one end to said lever, the other end of said rod being connected to one of said parallel links, a rock shaft journalled in said upright members, a notched quadrant plate fixed on the other of said upright members, an auxiliary lever fixed on said shaft and having a latching element releasably engageable in one of the notches of said plate, said auxiliary lever affording depth adjustment of said tool, a crank arm fixed on said shaft, a latch plate pivotally connected to one of said upright members, a link connecting said arm and said latch plate, and a latching element carried on said master lift lever and engageable with said latch plate, said master lift lever affording means for moving said linkage arrangement and tool to operative and inoperative positions.

6. In a tractor implement, a frame assembly, means for connecting said frame assembly to a tractor, said frame assembly including a pair of spaced stationary upright members, an upper and a lower parallel link pivotally connected to each of said upright members, a vertical link pivotally connected to corresponding upper and lower parallel links, said upright members and said links constituting a parallelogram linkage arrangement, a transverse tool bar secured to said vertical links, a tool supported by said tool bar, a master lift lever pivotally connected to one of said upright members, a lift rod pivotally connected at one end to said lever, the other end of said rod being connected to one of said lower parallel links, said master lift lever affording means for moving said linkage arrangement and tool to operative and inoperative positions, an auxiliary lever pivoted to the other of said upright members, a crank arm in rigid operative connection with said auxiliary lever, a latch plate pivotally connected to the first-mentioned upright member, a link connecting said crank arm and said latch plate, a latching element carried on said master lift lever and engageable with said latch plate, a notched quadrant plate fixed on the other of said upright members, said auxiliary lever having a latching element releasably engageable in one of the notches of said plate and affording depth adjustment of said tool.

7. In a tractor implement, a pair of upright members adapted for attachment to a tractor, upper and lower parallel links pivotally connected to each of said upright members, a vertical link pivotally connected to each of said upper and lower links, said upright members and said links constituting a parallelogram linkage arrangement, a ground-working tool carried by said linkage arrangement, a master lift lever pivotally connected to one of said upright members, link means connecting said lever with one of said parallelogram links, said master lift lever affording means for moving said linkage arrangement and tool to operative and inoperative positions, a rock shaft journalled in said upright members, an auxiliary lever fixed on said shaft, a crank arm fixed on said shaft, latch means pivotally connected to one of said upright members, a link connecting said arm and said latch means, a latching element carried on said master lift lever and engageable with said latch means, a fixed latch element carried on the first-mentioned of said upright members, said latching element when engaged with said fixed latch element locking said linkage arrangement in inoperative position, said latching element when engaged with said latch means locking said linkage arrangement in operative position, a notched quadrant plate fixed on the other of said upright members, said auxiliary lever having a latching element releasably engageable in one of the notches of said quadrant plate for securing said auxiliary lever relative to said quadrant plate, the rocking of said crank arm by said auxiliary lever affording pivotal adjustment and permitting the varying of the vertical position of said linkage arrangement.

8. In a tractor implement, a frame assembly, means for connecting said frame assembly to a tractor, said frame assembly including a pair of spaced stationary upright members, an upper and a lower parallel link pivotally connected to each of said upright members, a vertical link pivotally connected to corresponding upper and lower parallel links, said upright members and said links constituting a parallelogram linkage arrangement, a transverse tool bar adapted to be secured to said vertical links, a tool adapted to be supported by said tool bar, a master lift lever pivotally connected to one of said upright members, a lift rod pivotally connected at one end to said lever, the other end of said rod being connected to one of said lower parallel links, a rock shaft journalled in said upright members, an arm fixed on said shaft, a latch plate pivotally connected to one of said upright members, a link connecting said arm and latch plate, a latching element carried on said master lift lever and engageable with said latch plate, a notched quadrant plate fixed on the other of said upright members, an auxiliary lever fixed on said shaft and adapted for rocking said shaft and said arm fixed thereon, said auxiliary lever having a latching element releasably engageable in one of the notches of said quadrant plate for securing said auxiliary lever relative to said quadrant plate, the rocking of said arm by said auxiliary lever affording pivotal adjustment of said latching plate and vertical adjustment of said parallel linkage arrangement to vary the depth adjustment of said tool, a bar connecting said upright members, a forwardly extending pair of yoke arms pivoted at one end of said bar, a coulter supported for rotation at the other end of said yoke arms, a forwardly extending lift arm pivotally connected to one of said upright members, a link connecting said master lever and said lift arm, said link being connected to said lift arm at a point below the pivotal connection of said lift arm and said upright member, a lift rod connecting said lift arm at the forward end thereof with one of said yoke arms, the movement of said master lift lever effecting simultaneous corresponding directional movement of said tool and said coulter into operative and inoperative positions.

References Cited in the file of this patent
UNITED STATES PATENTS

| | | |
|---|---|---|
| 2,198,789 | Reisert | Apr. 30, 1940 |
| 2,588,918 | Graham | Mar. 11, 1952 |
| 2,637,564 | Stratman | May 5, 1953 |
| 2,693,747 | Tanke et al. | Nov. 9, 1954 |